UNITED STATES PATENT OFFICE.

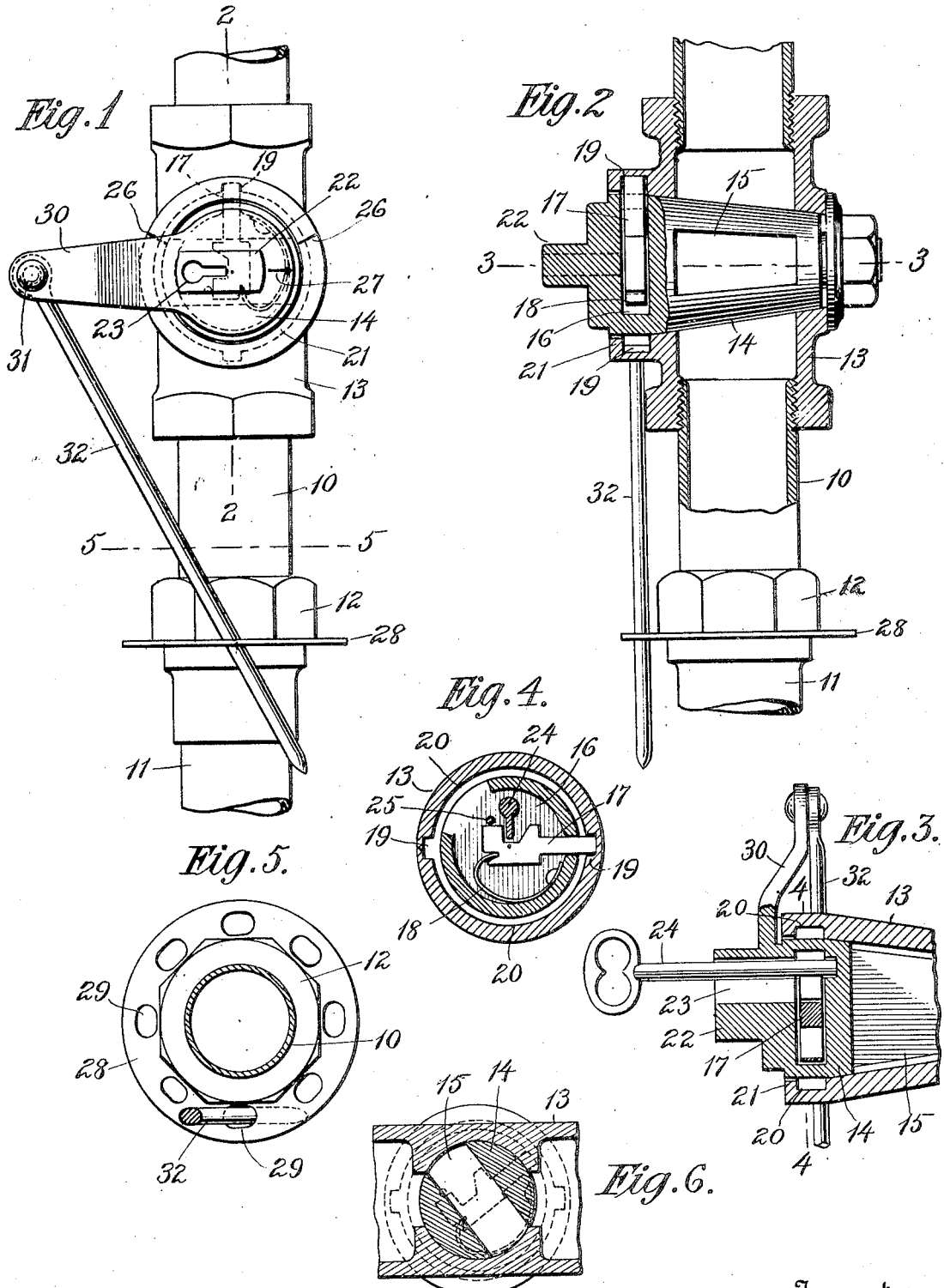

THOMAS H. YOUNG, OF NEW YORK, N. Y.

PROTECTIVE LOCK FOR GAS-PIPES.

1,057,609.

Specification of Letters Patent. Patented Apr. 1, 1913.

Application filed May 18, 1912. Serial No. 698,137.

*To all whom it may concern:*

Be it known that I, THOMAS H. YOUNG, a citizen of the United States, residing at New York city, in the county of New York and State of New York, have invented certain new and useful Improvements in Protective Locks for Gas-Pipes, of which the following is a specification.

The object of this invention is to provide means in connection with a lockable valve for preventing disconnection of a gas meter, or disconnection between two pipe-sections, except by a person having the key.

Of the accompanying drawings, Figure 1 represents a front elevation of a valve and pipe provided with protective means embodying my invention. Fig. 2 represents a vertical section thereof, on the line 2—2 of Fig. 1. Fig. 3 represents a transverse section on the line 3—3 of Fig. 2. Fig. 4 represents a section on the line 4—4 of Fig. 3. Fig. 5 represents a section on the line 5—5 of Fig. 1. Fig. 6 represents a longitudinal section through the valve and casing showing the valve turned off but not locked. In Figs. 4 and 6 the valve casing is turned 90° from its position in Fig. 1, and in Fig. 6 the valve is shown closed but unlocked.

In the drawings, 10 is a section of a pipe such as a gas-supply pipe, and 11 is a lower pipe section which may be attached to a gas-meter, the two sections being connected by the usual coupling nut 12.

In the pipe 10 is interposed a valve casing 13 and in this casing is mounted a tapered plug valve 14 having a through port 15. The large end of the valve is provided with a chamber 16 in which is mounted a locking bolt 17 projected into locking position by spring 18. The outer end of this bolt is adapted to enter either one of a pair of notches 19 located at opposite points on the inside of the rim of the valve casing 13, so as to prevent the valve from being turned, and when the bolt is retracted and the valve turned at an angle from the locking position, the end of the bolt is adapted to rest against either of two concentric portions 20 of the casing.

The casing is internally grooved or undercut in the zone occupied by the locking bolt, to provide a continuous retaining flange 21 behind which the bolt 17 may be sprung when the valve is assembled with the casing, thus rendering it impossible to axially remove the valve from its casing in any angular position of said valve without mutilating the apparatus.

On the outer wall of the valve is formed a boss 22 constituting a handle whereby the valve may be turned when unlocked, and in said wall and boss is formed a keyhole 23 through which a key 24 may be inserted. This key and the bolt 17 are relatively formed in any suitable manner so that the bolt may be withdrawn by means of the key to retract its outer end from either of the notches 19. A stationary pin 25 (Fig. 4) prevents the key from being turned far enough backward to draw the bolt from behind the retaining flange 21. The bolt is constantly urged in a locking direction by the spring 18 and will automatically snap into locking engagement with the casing whenever the key pressure is absent and the valve is turned to bring the bolt opposite one of the notches 19.

Preferably I place one or more stationary indicating marks 26 on the rim of the casing, and a mark 27 on the valve, in such a position that when the latter mark is brought into register with one of the marks 26 the port 15 of the valve will be in a position to shut off the flow of gas as represented in Fig. 6, but not in a position where the bolt 17 enters one of the notches 19 as in Figs. 1 and 4.

The operation of the parts thus far described is as follows: When the valve 14 is opened to supply gas to the customer, the end of the bolt 17 rests against one of the concentric surfaces 20 between the notches 19. If the customer desires to turn off the gas and lock the valve in closed position so that another occupant of the premises cannot use the gas, he turns the plug by means of the handle boss 22 into a position at right-angles to its full-open position, and the bolt 17 then snaps into a notch 19 and locks the valve, as represented for example in Fig. 1. The valve cannot then be unlocked except by a person possessing a key which will fit the lock. The customer or a repairer may however wish to turn off the gas temporarily without locking the valve, and this may be done by turning the valve into the position, substantially as represented in Fig. 6, with port 15 closed.

The foregoing or any other suitable construction of lockable valve may be used in connection with the features now to be described, or their equivalents, which more particularly constitute my invention.

As here shown the coupling nut 12 is provided with a flange 28 having a series of holes 29 around its circumference. On the end of the plug valve 14 is mounted an arm 30 to which is pivoted at 31 a rod 32 adapted to occupy any one of the holes 29. This rod is of such length that when the arm 30 is turned in a substantially upright direction, the rod will come out of the hole which it occupies in the flange 28 and allow the nut 12 to be unscrewed and the meter or lower pipe-section removed, but when said arm stands across the line of the pipe 10 as represented in Fig. 1, or when it points downwardly, the rod 32 will remain in the hole 29 and the nut 12 can not be unscrewed. When the device is installed on the customer's premises the arm 30 is placed in the lower semicircle of its movement and the customer cannot move it into the upper semicircle because the valve will automatically become locked in the position represented in Fig. 1 or in the opposite position, and he will therefore be unable to disconnect the meter. This can only be done by a person having the key who is able to unlock the valve and turn the arm 30 into an upright position.

While I have shown a preferred embodiment of the features of my invention it will be understood that the latter may assume various other forms without departing from the spirit and nature thereof.

I claim,—

1. The combination of a pipe having two sections connected by a coupling device, a valve in said pipe provided with locking means, and means connected with said valve and coupling device to prevent the uncoupling of the latter except in a predetermined position of said valve.

2. The combination of a pipe composed of two sections connected by a coupling nut, a rotary valve in said pipe, a locking device for said valve, and means connecting said valve and nut to prevent the latter from being uncovered except in a predetermined position of said valve, said means permitting locking and unlocking movements of the valve in other positions.

3. The combination of a pipe-section, a rotary plug-valve therein provided with locking means, an arm on said valve, a coupling nut adapted to connect said pipe section with another pipe section, and a retaining rod for said nut pivoted to said valve arm.

4. The combination of two pipe-sections connected by a coupling nut, an apertured flange on said nut, a rotary plug-valve mounted in one of said pipe-sections and provided with locking means, an arm on said valve, and a retaining rod pivoted to said arm and occupying an aperture of said flange.

5. The combination of two pipe-sections connected by a coupler, a rotary valve in one of said sections having a plurality of open positions and provided with means for locking it in closed position, and a coupler-retaining member connecting said valve and coupler in a closed position of said valve and in one open position thereof and disconnecting the two in another open position of said valve.

6. The combination of two pipe-sections connected by a coupling device, a rotary valve in one of said sections having means for automatically locking it in either of two closed positions, and a retaining member connecting said valve and coupling device when the valve is in either of said closed positions or in one open position between the two, and adapted to be disconnected from said coupling device when the valve is in the opposite open position.

7. The combination of two pipe-sections, a coupling nut connecting the two and having an apertured flange, a valve casing in one of said sections formed with opposite locking notches, a rotary plug-valve in said casing having a spring-projected bolt adapted to enter either of said notches to lock the valve in closed position, an arm on said valve, and a retaining rod pivoted to said arm and occupying an aperture of said flange when the valve is in either of its locked positions or in one of its open positions and withdrawn from said aperture when the valve is in its opposite open position.

In testimony whereof I have hereunto set my hand in the presence of two subscribing witnesses, this 16th day of May, 1912.

THOS. H. YOUNG.

Witnesses:
R. M. PIERSON,
JAMES H. YOUNG.